United States Patent [19]
Majima
[11] 4,140,249
[45] Feb. 20, 1979

[54] MANUAL SPRAY PUMP

[75] Inventor: Toshimichi Majima, Tokyo, Japan
[73] Assignee: Mitani Valve Co., Ltd., Tokyo, Japan

[21] Appl. No.: 789,937
[22] Filed: Apr. 22, 1977
[30] Foreign Application Priority Data
Sep. 18, 1976 [JP] Japan .......................... 51/125953[U]
[51] Int. Cl.$^2$ .............................................. G01F 11/32
[52] U.S. Cl. .................................... 222/321; 222/385; 239/333
[58] Field of Search ............... 222/321, 380, 383, 385; 239/321, 333

[56] References Cited

U.S. PATENT DOCUMENTS 3,399,836 9/1968 Pechstein ......................... 222/321 X
3,991,914 11/1976 Kotuby et al. ........................ 222/321
4,017,031 4/1977 Kishi et al. ....................... 222/321 X
4,051,983 10/1977 Anderson ............................ 222/321

*Primary Examiner*—Joseph J. Rolla
*Attorney, Agent, or Firm*—Eyre, Mann, Lucas & Just

[57] ABSTRACT

A manual spray pump comprises a cylinder consisting of different diameter portions integral with one another and extending from one another and large and small pistons having respective collars of different diameters and fitted in respective cylinder portions in elastic contact with the inner wall thereof for reciprocal movement in the axial direction. The small piston is coupled to the large piston such as to receive liquid pressure therefrom, and a valve body provided at the top of the small piston co-operates with a valve seat of the large piston to constitute an opening valve. Further, in order to control or suppress too sensitive action of the small piston under low liquid pressure when actuating the opening valve with the liquid pressure exerted from the large piston to the small piston, the small piston is provided with an integral additional piston member of a still smaller diameter or is adapted to produce a frictional force in part of its portion coupled to the large piston. Still further, part of the cylinder wall is provided, at a position near the position of the end of downward stroke of either large or small piston, with an escapement hole for releasing the residual liquid pressure so as to be able to bring a sudden end to the spraying and eliminate spraying under low liquid pressure.

8 Claims, 9 Drawing Figures

FIG. 5
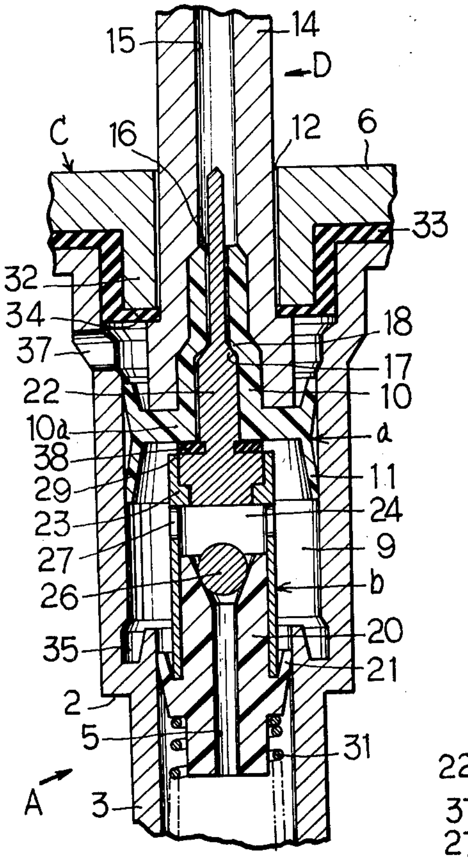
FIG. 6
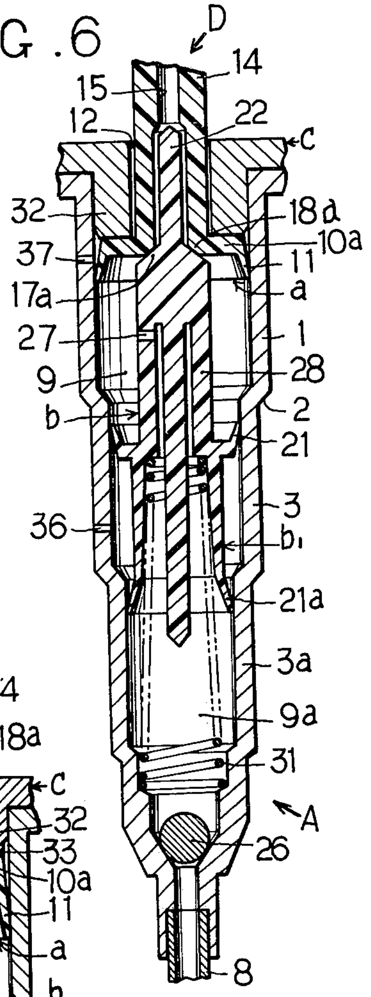
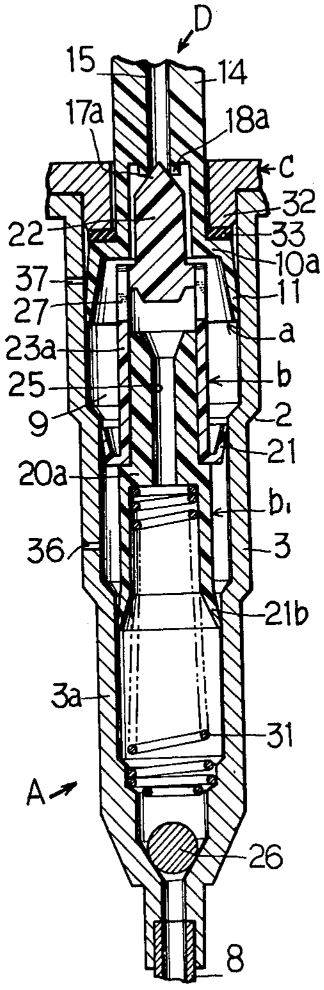
FIG. 7

MANUAL SPRAY PUMP

BACKGROUND OF THE INVENTION

A well-known construction of spray pumps for spraying cosmetic liquid, insecticide, washing liquid and other home spray liquid has two pistons of different diameters and serially coupled to each other, that is, with the small piston coupled before the large piston. The large piston has a valve adapted to be closed in the direction of supplying liquid, while the small piston has a valve adapted to be opened only in the direction of supplying liquid. Further, the small piston is spring biased so that it is normally held at its dead point.

Generally, the subject matter of these spray pumps have a number of times the discharge capacity of other well-known spray pumps of the same three-dimensional size. Also, they permit spraying of liquid under a high stored liquid pressure without the necessity of quickly or slowly depressing the pump piston with a finger, that is, irrespective of whether the piston is depressed with high or low finger pressure, thus permitting a finely atomized liquid spray pattern by a high pressure jet to be obtained. In case of the insecticide, these features can meet the requirement for the atomized liquid particles to float in space for a long period of time so as to obtain enhanced insecticidal effects. Also, in case of cosmetic liquid or the like they can be utilized as means for providing fine liquid particles which are required since it is desirable that the sprayed liquid quickly forms a thin film.

Regarding the structure of the small piston in these spray pumps, the small piston is disposed below the large piston or concentrically disposed within the large piston or has other structures. In any case, it is arranged such as to receive liquid pressure increased by the large piston and be displaced by the received liquid pressure so as to open a valve which is normally closed in the direction of supplying liquid, thus permitting liquid under increased pressure to be sprayed from a nozzle button connected to the top of the cylinder. However, the small piston tends to be too sensitive to the liquid pressure received from the large piston, so that the valve of the small piston is liable to be actuated before the liquid pressure is sufficiently increased. In such case, the effect that can be provided by the subject liquid in this type of spray pump cannot be satisfactorily obtained. Besides, in these spray pumps the individual component parts are assembled within a small space, thus requiring high precision in manufacture. Further, the component parts are large in number and are complicated, so that the construction is readily prone to trouble.

The spray pump according to the invention can control or suppress too sensitive action of the small piston without sacrifice in light and smooth operation and permits displacement of the small piston only under a sufficiently increased liquid pressure so that the effects which are to be provided by this type of spray pump to be obtained sufficiently and reliably. In addition, its construction is simplified by providing individual pistons of different diameters whithin a single cylinder consisting of different diameter portions. Further, a sudden end can be brought to spraying as soon as the last stage of downward stroke of piston is reached.

SUMMARY OF THE INVENTION

An object of the invention is to provide a spary pump, which comprises a cylinder having a valve adapted to be opened only in the direction of supplying liquid so as to provide for simple and reliable assembly of piston parts and also for steady operation, said cylinder including an upper large diameter cylinder portion and a lower small diameter cylinder portion integral with and extending from the large diameter cylinder portion, and if necessary a still smaller diameter cylinder portion integrally extending from the lower end of the small diameter cylinder portion, said cylinder accommodating a large piston and a small piston adapted to receive the liquid pressure from the large piston, said small piston being provided, if necessary, with a still smaller piston secured to the small piston, these pistons having their respective collars in elastic contact with the respective cylinder portions so that they are reciprocable in the cylinder in the axial direction thereof.

Another object of the invention is to provide a spray pump, in which the small piston is provided with a still smaller piston integral therewith or has a portion in partial frictional contact with an associated portion of the large piston to produce additional friction force in order for the valve of the small piston closed in the direction of supplying liquid to be actuated only with a sufficiently increased stored pressure received from the large piston.

A further object of the invention is to provide a spray pump, in which part of the cylinder wall is provided, at a position near the position of the end of downward stroke of either large or small piston, with an escapement hole for releasing the residual liquid pressure in relation to either piston as soon as the last stage of the downward stroke is reached, thereby interrupting the spraying of coarsely atomized liquid under reduced liquid pressure in the last stage of the downward stroke.

DESCRIPTION OF THE DRAWINGS

FIG. 5 is a view similar to FIG. 2 but showing a modification of the embodiment of FIGS. 1 to 4 and preferentially showing the large piston and small piston; and FIGS. 6 to 9 are axial sectional views showing other embodiments of the invention.

DESCRIPTION OF THE PREFERRED EMBODIMENTS

Figure 1:
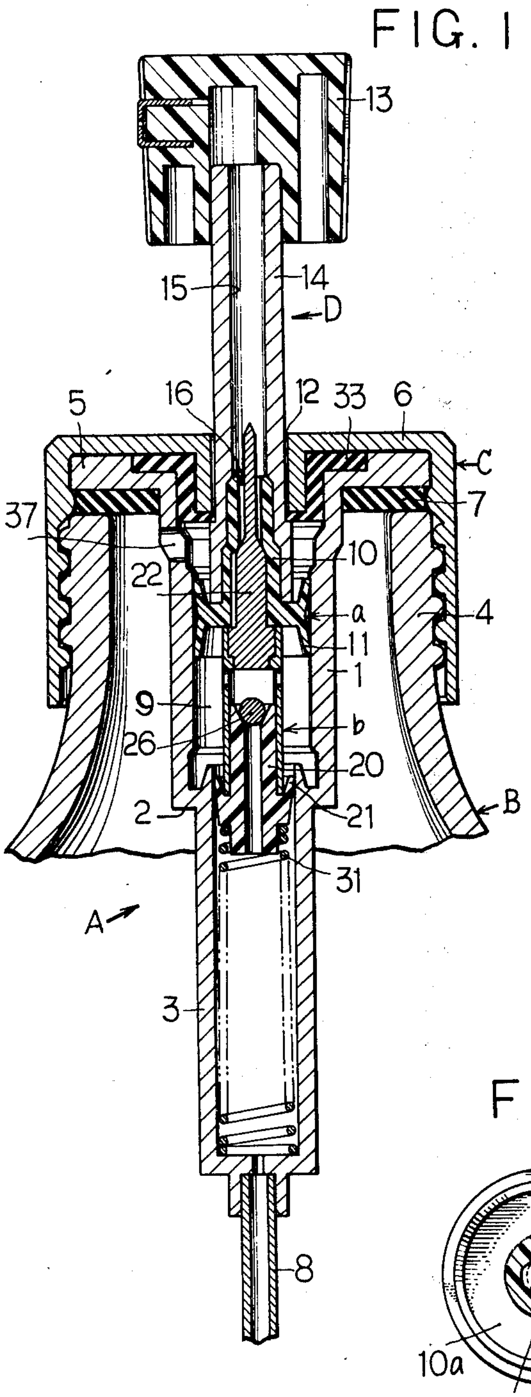
FIG. 1 is an axial sectional view showing an embodiment of the invention.

The spray pump according to the invention comprises a cylinder consisting of different diameter portions integral with one another and extending from one another and large and small pistons having respective collars of different diameters and fitted in respective cylinder portions in elastic contact with the inner wall thereof for reciprocal movement in the axial direction. The small piston is coupled to the large piston such as to receive liquid pressure therefrom, and a valve body provided at the top of the small piston co-operates with a valve seat of the large piston to constitute an opening valve. Further, in order to control or suppress too sensitive action of the small piston under low liquid pressure in the initial stage of stroke when actuating the opening valve with the liquid pressure exerted from the large piston to the small piston, the small piston is provided with an integral additional piston member of a still smaller diameter or is adapted to produce a frictional force in part of its portion coupled to the large piston. Still further, part of the cylinder wall is provided, at a position near the position of the end of downward stroke of either large or small piston, with an escapement hole related to either piston for releasing the residual liquid pressure so as to bring a sudden end to the spraying.

Preferred embodiments of the invention will now be described with reference to the accompanying drawings.

Designated at B is a bottle or other container accommodating a spray liquid such as cosmetic liquid, chemical, etc. It is formed on its portion adjacent to its open end with a male thread, on which a cap C is screwed such as to keep a pump cylinder A in a fixed position. The pump cylinder A has its flange 5 at its upper end fitted in the cap C and clamped between the inner wall of the top 6 of the cap and the end of the container B via a seal member 7 provided on the underside of the flange 5.

The pump cylinder A includes an upper cylinder wall portion 1 of a large diameter and an integral lower cylinder wall portion 3 of a smaller diameter, and these large and small diameter cylinder wall portions 1 and 3 accommodate respective large and small pistons a and b, which have such diameters that they are snugly fitted in the associated cylinder wall portions for reciprocal movement in the axial direction. In embodiments shown in FIGS. 6 and 7, pump cylinder A includes, in addition to upper large diameter cylinder wall portion 1 and lower small diameter cylinder wall portion 3 integral therewith via a shoulder 2, a further cylinder wall portion 3*a* integrally extending from the lower end of the small diameter cylinder wall portion 3 and having a smaller diameter than the diameter of the cylinder wall portion 3. In this case, small piston b is combined with an additional small piston $b_1$. A spray liquid suck-up tube 8 has its upper end fitted in the lower end of the pump cylinder A, and its lower end (not shown) is usually located right above the bottom of the container B so that the liquid may be sucked up through it into a liquid chamber 9 in the cylinder by the action of the pump pistons.

The large piston a, which occupies the interior of the large diameter cylinder wall portion 1 and serves to withdraw and compress the liquid, comprises a tubular member 10, an outer flange portion 10*a* integral with the lower end of the tubular member and a collar 11 integral with the outer periphery of the outer flange portion and in elastic contact with the cylinder inner wall so that it can be moved in the axial direction within the cylinder.

Figure 4:
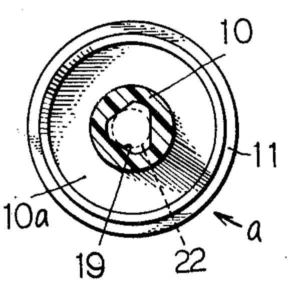
FIG. 4 is a section taken along line IV—IV in FIG. 3.

The tubular member 10 is tightly fitted in the lower end portion of a valve tube 14, which penetrates a central opening 12 of the cap C to upwardly extend therefrom and carries a nozzle button 13 secured to its upper end, and it thus constitutes a plunger D together with the valve tube. Also, it has a central axial bore 16 communicating with the passage 15 in the valve tube 14 and is formed in an intermediate position of the bore with a valve seat 18 co-operating with a valve shoulder 17 of the small piston b to be described later. The portion of the bore 16 extending downwardly from the valve seat 18 has a comparatively large diameter and is a polygonal bore 19 having a polygonal sectional shape, as most clearly shown in FIG. 4.

In embodiments shown in FIGS. 6 to 9, the plunger does not have any tubular member, that is, valve tube 14 is integral with collar 11 constituting part of large piston a, with the valve seat formed at the lower open end or the intermediate position 18*a* of passage 15.

Further, the central bore of the large piston a need not be a polygonal bore as will be made apparent hereinafter in relation to the small piston b.

The small piston b, which occupies the interior of the small diameter cylinder wall portion 3, comprises a tubular member 20 integral with a lower end collar 21 in elastic contact with the cylinder inner wall so that it can be moved in the axial direction within the cylinder. More particularly, the small piston b, is an assembly comprising the tubular member 20, a cylinder 23 tightly fitted on the tubular member and a needle 22 extending from the upper end of the cylinder.

The liquid chamber is formed with the small piston b and the large diameter cylinder A. The pressure of liquid is on the increase, when the nozzle button 13 is downwardly pushed. The small piston b has an inner cavity 24, and the upper end of a bore 25 in the tubular member 20 open to the cavity 24 is occupied by a check valve ball 26 which is adapted to be opened only when withdrawing liquid. Further, the wall of the cylinder 23 is formed with lateral holes 27 communicating the cavity 24 with the liquid chamber 9 outside thereof so that liquid withdrawn by the action of the pump pistons may be led into the liquid chamber 9.

The small piston b is always upwardly urged by the pressure provided by a bias spring 31 having a lower end thereof received in the bottom of the pump cylinder A, that is, the bias spring 31 serves to hold the small piston b in position at the upper end of the small diameter cylinder wall portion 3 and also hold a shoulder 29 of the cylinder 23 in engagement with the lower end of the large piston a. The needle 22 of the small piston b is loosely inserted in the central bore 16 of the tubular member 10 such as to provide a liquid passage, and also it has a valve shoulder 17 adapted to butt against the valve seat 18.

The portion of the needle 22 occupying the interior of the polygonal bore 19 has a diameter such that it is in contact with each side of the polygon, that is, its outer periphery is in partial contact with the inner wall of the bore, so that frictional force can be produced with the axial movement of the small piston b. This frictional force is provided in order to control or suppress sensitive downward action of the small piston b in response to liquid pressure exerted to it. In other words, it is desirable that the outer periphery of the needle is in partial contact with the wall of the bore while always providing a liquid passage. With such arrangement, there is no possibility of interferring with smooth pump operation. It is to be understood, although not illustrated, that regarding the frictional force produced between the needle 22 and polygonal bore 19 the same effects can be obtained by forming the needle 22 as polygonal needle against the embodiment.

In the embodiment of FIG. 6, the small piston b comprises a rod-like one-piece member 28 having an upper needle 22 and lower integral collars 21 and 21*a* in elastic contact with the inner walls of the respective small cylinder wall portions 3 and 3*a*. The valve shoulder 17*a* of the small piston b is adapted to butt against the lower open end of the plunger D as the valve seat 18*b*, and a check valve ball 26 is provided at the bottom of the cylinder A. Further, the liquid chamber 9 is always communicated with the other chamber 9*a* by a lateral hole 27 formed in the small piston b. At the two points (21 and 21*a*), the small piston contacts with the cylinder inner wall, so it's frictional force against the inner wall is great.

Figure 8:
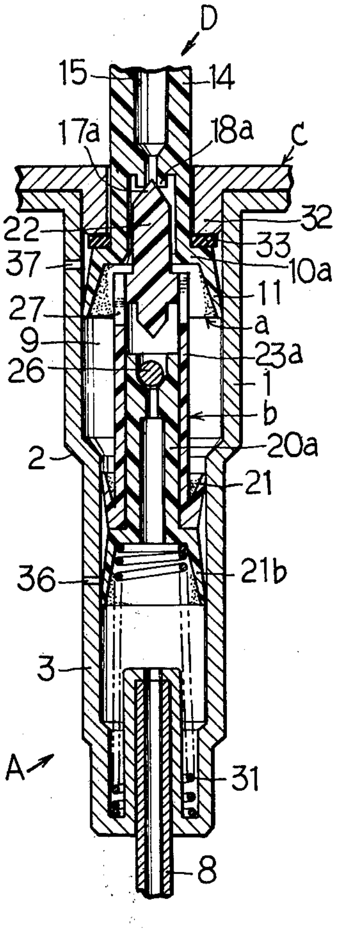

In the embodiments of FIGS. 7 and 8, the small piston b is an assembly consisting of a cylindrical member 23*a* having an upper needle portion 22 and another tubular member 20*a*. The cylindrical member 23*a* having the needle 22 also has a lateral hole 27 and is tightly fitted on an upper end portion of the tubular member 20*a*, which has a collar 21*b* in elastic contact with the cylinder inner wall. The tubular member 20*a* has a central bore 25 in communication with the afore-mentioned lateral hole 27, and its lower end has an integral collar 21*b* in elastic contact with the inner wall of the cylinder wall portion 3*a* having a still smaller diameter. Check valve ball 26 is provided at the bottom of cylinder A, and the needle 22 of the small piston b has valve shoulder 17*a* adapted to butt against valve seat 18*a* formed within the plunger D. In FIG. 8, check valve ball 26 is provided to occupy the upper end of central bore 25 of the other tubular member 20*a*. Also in FIG. 8, in the small piston b collars 21 and 21*b* constituting the piston have the same diameter and in frictional contact with the cylinder wall portion 3. This construction will provide a frictional force greater than that which can be expected from the other embodiments of the invention.

Figure 9:
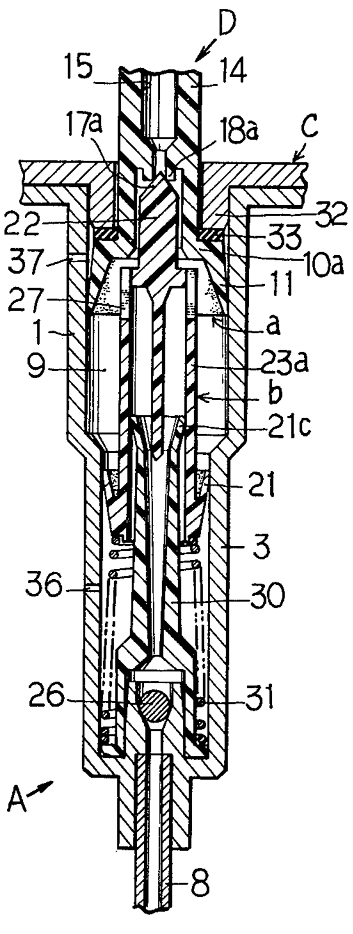

In the embodiment of FIG. 9, the small piston b consists of a tubular member 23*a* having needle 22, lateral hole 27 and collar 21. Check valve ball 26 is provided at the bottom of cylinder A. The ball is surrounded by a lower end of a tubular member 30, which has its upper portion movably fitted in the tubular member 23*a*. The tubular member 30 has a collar 21*c* in elastic contact with the inner wall of the tubular member 23*a*. With this contact of the collar 21*c* frictional force similar to that mentioned hereinbefore is provided at the time of action of the small piston b.

Figure 2:
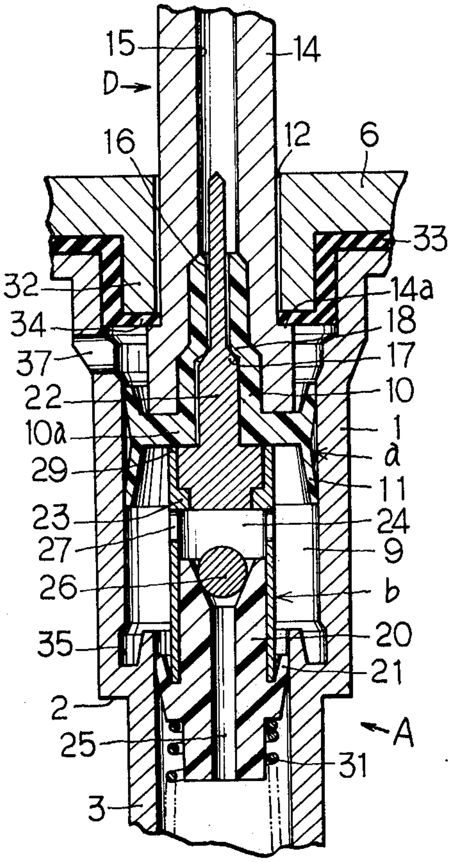
FIG. 2 is a sectional view, to an enlarged scale, preferentially showing the large piston and small piston shown in FIG. 1.
Figure 3:
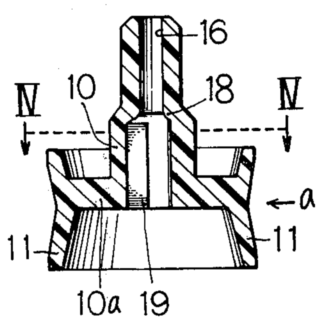
FIG. 3 is a sectional view, to an enlarged scale, showing the large piston shown in FIG. 1.

The upwardly urging force of a spring 31 is transmitted even to the plunger D. As shown in FIG. 2, a shoulder 14*a* of the valve tube 14 constituting the plunger D is urged against the lower open end of a tubular portion 32 (cap C), and the plunger D is held in this state when the spray pump is out of use. In the FIGS. 6 to 9, the plunder D has the flange-like portion 10*a* having the collar 11. The flange-like portion 10*a* is urged against the lower end of the tubular portion 32 of cap C. In the FIGS. 7 to 9, a packing 33 is interposed between the lower end of the tubular portion 32 and the shoulder of the plunger D, in order to prevent leakage that might otherwise result from occasional turning-down of the container when the spray pump is out of use.

In FIGS. 1 to 5, a cup-shaped packing 33 covers the tubular portion 32 of the cap C. It is fitted on the cap and secured thereto, with its edge of its button hole engaging the shoulder of the valve tube and with its bottom 34 having a small thickness to provide satisfactory flexibility.

The packing 33 is in contact with the outer periphery of the plunger D during the plunger's downward moving. But, when the plunger upwardly moves, the packing's contacting part with the plunger's periphery is downwardly bent by the pressure difference between the inside and outside of the container B, thereby the space between the packing and the plunger arises. So, the pressure of the container's inside becomes equal to the that of the container's outside. Further, when residual liquid pressure within the cylinder is released in the structure of FIGS. 1 to 5, it serves to prevent leakage of liquid, which rushes upward along the outer periphery of the collar 11 and enters the opening 12 of the cap C.

Designated at 35, as shown in FIGS. 2, 5, is an annular recess formed in the lower end of the inner wall of the large diameter cylinder wall portion 1 and having a diameter slightly greater than the inner wall diameter.

It is adapted such that the lower end of the collar 11 of the large piston a is received in said recess in the last stage of the downward stroke of the large piston.

At this stage, a gap or "escapement passage" is formed on the outer periphery of the collar 11 to provide communication between the liquid chamber 9 where the pressure is stored and the upper portion of the cylinder and also interior of the container, to thereby momentarily releasing reduced residual liquid pressure.

While this "escapement passage" is provided in relation to the large piston a in the embodiment of FIGS. 1 to 5, in the embodiments of FIGS. 6 to 9 this is replaced by a lateral hole 36, which is provided in the small diameter cylinder wall portion 3 such that it is possible for the collar 21 of the small piston b to move downwardly over the lateral hole 26, thereby providing communication between the liquid chamber 9 and the interior of the container B for releasing the residual liquid pressure.

Designated at 37 is a vent hole provided in an upper portion of the large diameter cylinder wall portion 1.

In FIG. 5, a packing 38 is particularly provided between engaging faces of the large and small pistons a and b. It has an effect of assisting the valve action of the valve of the small piston b.

With the spray pump according to the invention, by intermittently depressing the nozzle button with finger pressure the liquid pressure in the liquid chamber 9 is increased by the action of the large piston a. In the well-known construction of this type the valve of the small piston is immediately opened with a weak pressure that is developed in an initial stage of the downward stroke of the plunger. In contrast, with the embodiments mentioned above according to the invention, in which the small piston b is given an appropriate frictional force, against the small cylinder, the valve of the small piston is opened only with a high pressure, thus permitting a spray of atomized liquid to be suddenly produced from the nozzle button under a high pressure.

What is claimed is:

1. A spray pump comprising a cylinder having a large diameter cylinder portion accomodating a large piston and a small diameter cylinder portion extending from said large diameter cylinder portion and accomodating a small piston, a suction tube extending from said small diameter cylinder portion, a check valve disposed in a passage formed in said suction tube, a valve tube supporting and communicating with a nozzle button, said valve tube being occupied by a portion of said large piston and extending into said large diameter cylinder portion, a spring for biasing said large and small pistons and said valve tube to a rest position, said small piston extending into the interior of said large diameter cylinder portion and having a bore communicating therewith, said small piston also having a needle extending from its upper end, said needle and said large piston portion forming a valve member for an outlet passage in said valve tube, said small piston further being movably fitted in said small diameter cylinder portion and responsive to liquid pressure from said large piston and said small piston having a collar in elastic contact with said small diameter cylinder portion, one of said needle and large piston portion having a polygonal shape and the other thereof having a cylindrical shape and said polygonal and cylindrical shapes being in frictional contact with each other.

2. The spray pump according to claim 1, wherein the cylinder accomodating said large and small pistons is provided with an air vent hole and said cylinder further being provided with means for releasing residual liquid pressure within said large diameter cylinder portion.

3. The pray pump according to claim 1, which further comprises a packing provided on the stem of said needle serving as an auxiliary valve.

4. The spray pump according to claim 1, which further comprises a cup-shaped packing fitted on and covering a cylindrical portion of a cap mounting said spray pump on a container, said fitting extending from an opening in said cap into the large diameter cylinder portion, a shoulder formed on said valve tube being urged by said spring against an edge portion of said cup-shaped packing to seal said cap opening and said edge portion serving as a flexible air intake valve upon a downward movement of said valve tube relative to said cup-shaped packing.

5. A spray pump comprising a cylinder having a large diameter cylinder portion accomodating a large piston and a small diameter cylinder portion extending from said large diameter piston portion and accomodating a small piston, a suction tube extending from said small diameter cylinder portion, a check valve disposed in a passage formed in said suction tube, a valve tube supporting and communicating with a nozzle button, said valve tube being occupied by a portion of said large piston and extending into said large diameter cylinder portion, a spring for biasing said large and small pistons and said valve tube to a rest position, said small piston extending into the interior of said large diameter cylinder portion and having a bore communicating therewith, said small piston also having a needle extending from its upper end, said needle and said large piston portion forming a valve member for an outlet passage in said valve tube, said small piston further being movably fitted in said small diameter cylinder portion and responsive to liquid pressure from said large piston, said small diameter cylinder portion being provided with a still smaller diameter cylinder portion extending therefrom and accomodating a still smaller piston formed as an integral extension of said small piston.

6. The spray pump according to claim 5, wherein the cylinder accomodating said large and small pistons is provided with an air vent hole and said cylinder further being provided with means for releasing residual liquid pressure within said large diameter cylinder portion.

7. The spray pump according to claim 5, which further comprises a packing provided on the stem of said needle serving as an auxiliary valve.

8. The spray pump according to claim 5, which further comprises a cup-shaped packing fitted on and covering a cylindrical portion of a cap mounting said spray pump on a container, said fitting extending from an opening in said cap into the large diameter cylinder portion, a shoulder formed on said valve tube being urged by said spring against an edge portion of said cup-shaped packing to seal said cap opening and said edge portion serving as a flexible air intake valve upon a downward movement of said valve tube relative to said cup-shaped packing.

* * * * *